Figure 1:
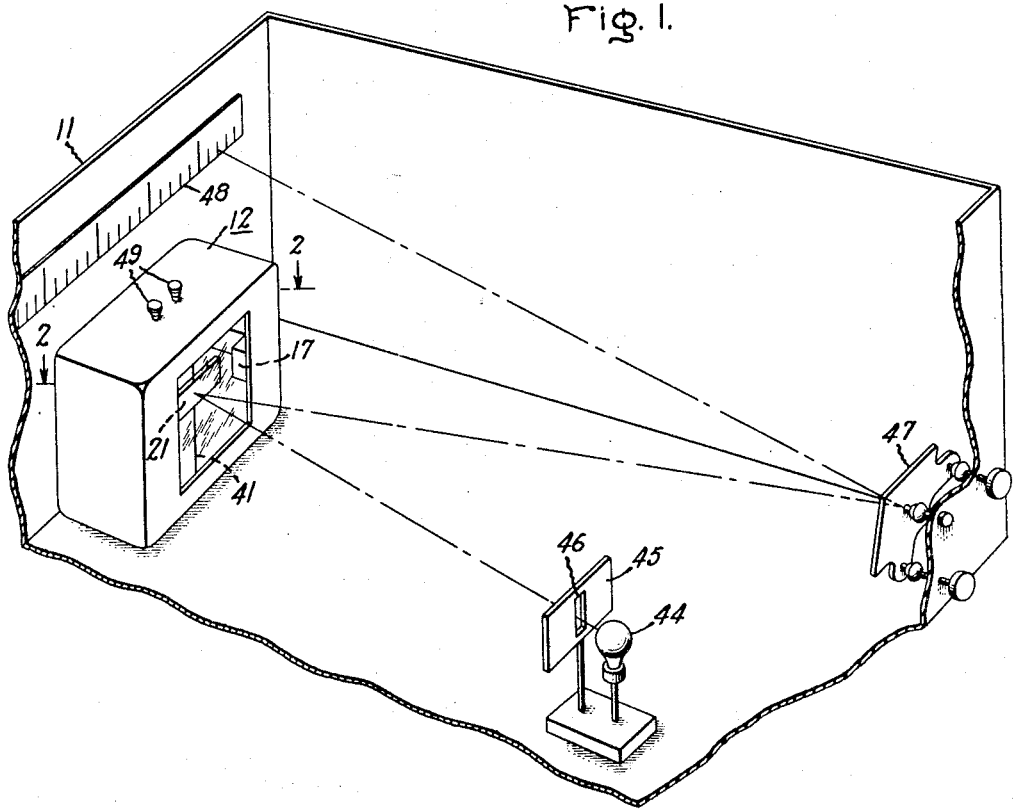

Aug. 5, 1958 T. A. RICH 2,846,650
LIGHT REFLECTING TRANSDUCER DEVICE
Filed June 26, 1952 3 Sheets-Sheet 1

Inventor:
Theodore A. Rich,
by Paul A. Frank
His Attorney.

Aug. 5, 1958 T. A. RICH 2,846,650
LIGHT REFLECTING TRANSDUCER DEVICE
Filed June 26, 1952 3 Sheets-Sheet 2
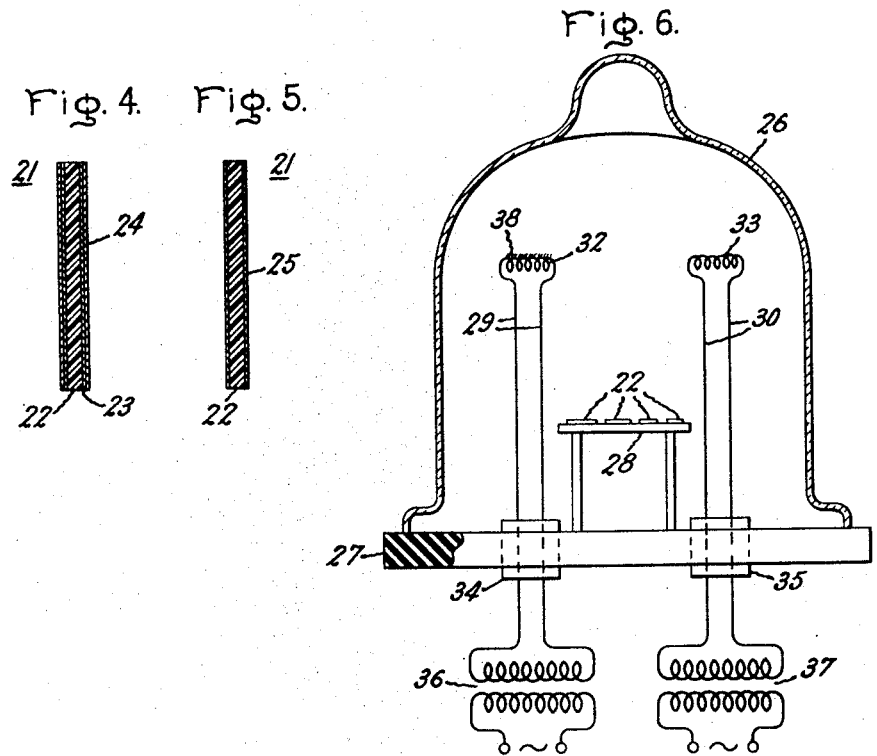
Inventor:
Theodore A. Rich,
by Paul A. Frank
His Attorney.

| United States Patent Office | 2,846,650 |
|---|---|
| | Patented Aug. 5, 1958 |

2,846,650

LIGHT REFLECTING TRANSDUCER DEVICE

Theodore A. Rich, Schenectady, N. Y., assignor to General Electric Company, a corporation of New York Application June 26, 1952, Serial No. 295,662

14 Claims. (Cl. 324—97)

The present invention relates to an electrical transducer and to a novel magnetizable structure adapted for use therewith as a movable armature element.

More specifically, the invention relates to an improved transducer for converting electrical to mechanical energy which is particularly suitable for use in electrical measuring instruments; and to a novel permanently magnetizable structure which may have a light-reflecting surface, and is highly satisfactory for use as the movable armature of electrical measuring instrument transducers.

In the electrical measuring instrument field, considerable effort and resources have been expended in attempting to develop a high-sensitivity, fast response electrical measuring instrument of the type comprising an elementary electric transducer or motor for converting the electric energy to be measured into an observable or measurable mechanical movement, and an indicating means comprising a pointer arm or mirror secured to the movable armature of the transducer for producing a perceptible indication of the movement induced by the electric energy being measured. For the most part, the sensitivity of instruments of this nature, as well as their response period, is determined mainly by the ratio of the mass of the moving element or load (comprised of the movable armature of the transducer portion and the indicator arm or mirror attached thereto), versus the electrical torque producing qualities of the instrument.

In many presently known instruments, the mass of the moving element (load) of the instrument generally includes at least the mass of the movable armature of the transducer portion of the instrument (presently constructed of all-ferrous material), and the mass of the indicator means such as a pointer arm or mirror. Because each of these parts, and particularly the all-ferrous movable armature, has considerable mass in itself, it is extremely difficult, if not virtually impossible, to improve the sensitivity, and/or response period of the known instruments of this type to any great extent. For this reason, in order that a suitable, high sensitivity, fast response instrument be available in the art, it was necessary drastically to revise the construction of the instrument. In particular, it was necessary to change the construction of the movable armature of the transducer in some manner so as to reduce its mass and also to lessen the loading effect of the indicating arm or mirror.

It is therefore one object of the present invention to provide a novel permanently magnetizable structure which has a relatively small mass, and which is suitable for use as the movable armature of a transducer device.

Another object of the invention is to provide a novel permanently magnetizable structure of small mass that has a light reflecting surface, and is particularly well adapted for use as the movable armature of the transducer portion of an electrical measuring instrument.

Another object of the invention is to provide an improved transducer device for converting electrical to mechanical energy, and having a permanently magnetizable, movable armature which has a relatively small mass, and, if desired, may also have a light-reflecting surface.

A still further object of the invention is to provide an improved instrument for measuring electrical energy which has a relatively fast response to comparatively weak electrical signals.

In its broadest aspects, my invention makes available in the art a permanently magnetizable structure of relatively small mass which comprises a relatively lightweight piece of non-magnetizable material having a thin film of magnetizable material formed on its surface, and which is suitable for use as the movable armature of a transducer device. If desired, the permanently magnetizable structure may be constructed so as to have a light reflecting surface, and therefore is particularly well adapted for use as the movable armature of the transducer portion of an electrical energy-measuring instrument.

As a further feature, the invention also provides an improved transducer which includes a means for producing a varying magnetic field, and a movable armature disposed in the varying magnetic field that is comprised of a relatively lightweight piece of non-magnetizable material having a thin film of magnetizable material formed on its surface. As a still further feature, the invention provides a transducer device of the above type wherein the movable armature element has a light-reflecting surface, the transducer being designed for use in combination with a source of light adapted to have a portion of its rays impinge on the light-reflecting surface of the movable armature, and an indicator scale positioned adjacent the transducer and adapted to have the rays of light reflected from the light-reflecting surface of the movable armature impinge on its surface whereby an indication of the character of the electrical energy applied to the transducer may be obtained.

Figure 2:
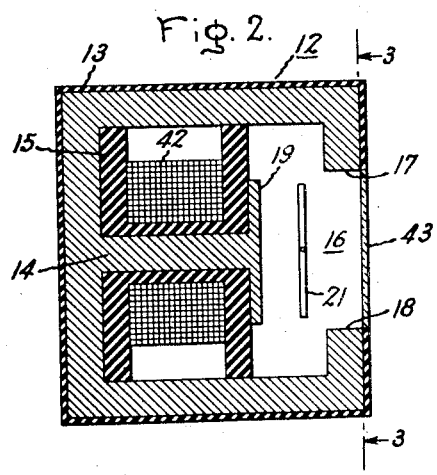
Figure 3:
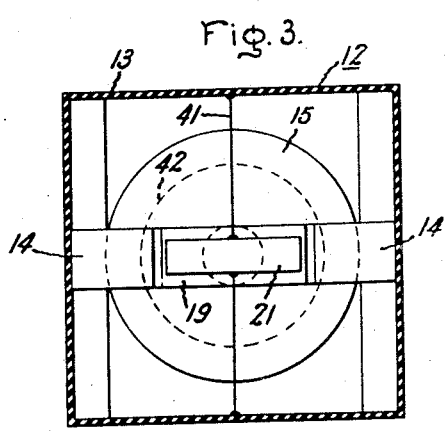
Figure 7:
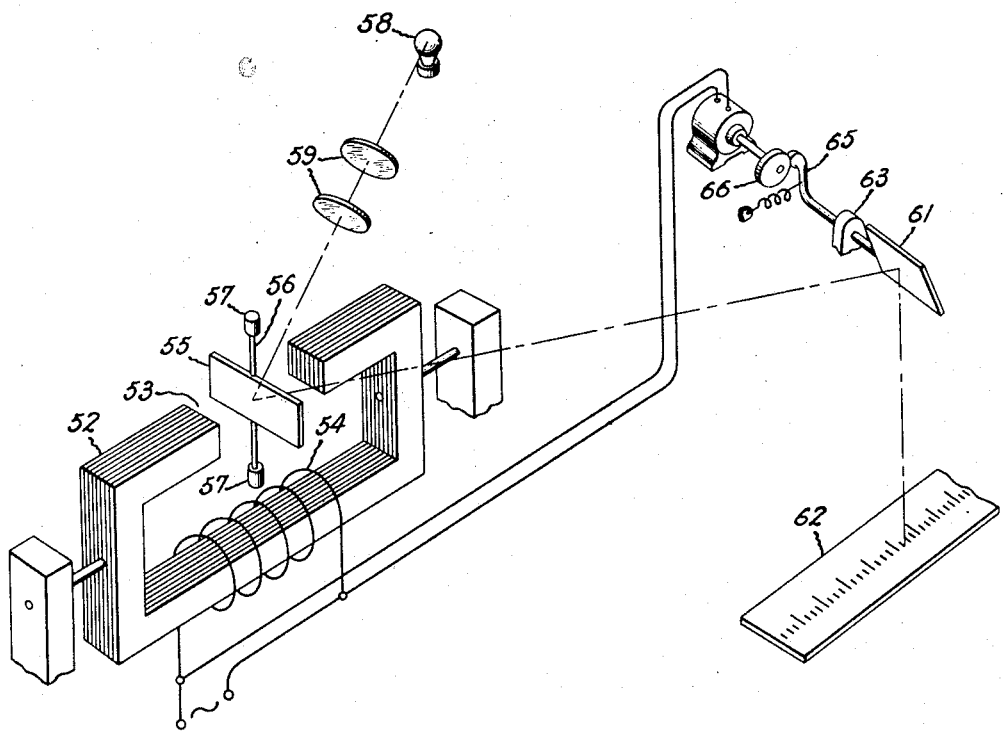

Other objects, features and many of the attendant advantages of this invention will be more readily appreciated as the same becomes understood by reference to the following detailed description when considered in connection with the accompanying drawings, wherein like parts are identified by the same reference character, and wherein:

Fig. 1 is a perspective view of an electrical measuring instrument having the casing thereof partially broken away, and incorporating a transducer device that includes many of the novel features of present invention; Fig. 2 is a cross-sectional view taken through plane 2—2 of Fig. 1 of an improved transducer device comprising a part of the invention, and included in the instrument shown in Fig. 1; Fig. 3 is a sectional view, taken through plane 3—3 of Fig. 2, of the transducer device shown in Fig. 2; Fig. 4 is a cross-sectional view of one form of a novel permanently magnetized structure that may be included in the transducer device illustrated in Figs. 2 and 3 as the movable armature thereof; Fig. 5 is a cross-sectional view of a second form of a novel permanently magnetizable structure that may be used as the movable armature of the transducer device shown in Figs. 2 and 3; Fig. 6 is a schematic view of an arrangement for producing either of the permanently magnetizable structures shown in Figs. 4 and 5 of the drawings; Fig. 7 is a schematic view of a second electrical measuring instrument which incorporates many of the novel features of the present invention; and Fig. 8 is a schematic view of a novel, extremely sensitive anemometer, made possible by reason of the invention.

Referring now to Fig. 1 of the drawings more specifically an instrument for measuring electrical energy is shown. The instrument comprises a generally rectangular container 11 of wood, or some similar material, hat is illustrated with the sides thereof partially broken away in order that the elements of the instrument and their physical arrangement within the container 11, can be seen. Mounted within container 11 is an improved transducer device, shown broadly at 12, for converting electrical energy to a mechanical movement that can be observed or measured, and which comprises a part of the present invention.

With reference now to Figs. 2 and 3 of the drawings, the construction of the improved transducer device 12 is more fully disclosed. The transducer device includes an outer casing 13 preferably constructed of an insulating material, and having supported therein an electromagnet core structure 14 which forms a pair of parallel magnetic flux paths. The core structure 14 is supported within outer casing 13 by a core mounting form 15 also constructed of an insulating material, and has an open area, shown at 16, which defines a pair of pole pieces 17 and 18 of like polarity having a third common pole piece 19 of opposite polarity disposed across open area 16 therefrom. Positioned in open area 16 is a novel, permanently magnetizable, movable armature 21. Because the transducer illustrated in Figs. 2 and 3 is primarily intended for use in an electrical measuring instrument, the movable armature 21 also preferably has a light-reflecting surface; however, it should be understood that by certain modifications the transducer device can be readily adapted for other uses, as it is not necessarily restricted in its use to measuring instruments, nor must the movable armature 21 thereof necessarily have a light-reflecting surface.

Adverting next to Fig. 4 of the drawings, one embodiment of a novel, permanently magnetizable structure 21 is illustrated which comprises a part of the present invention, and which is highly suitable for use as the movable armature 21 of the transducer shown in Figs. 2 and 3 of the drawings. The permanently magnetizable structure 21 includes a first piece of backing material 22 of relatively light weight, and comprises a relatively thin sheet of insulating material, preferably a flake of mica, having a thickness in the order of a fraction of a millimeter. In the embodiment of the magnetizable structure shown in Fig. 4, the piece of backing material 22 has a very thin film 23, 24 of magnetizable material covering the same which comprises a first layer of ferrous material 23 formed on the surface of backing material 22, and a second layer of aluminum 24 formed on the film of ferrous material 23 to protect the same, and to provide a light-reflecting surface. The film of magnetizable material formed by layers 23 and 24 is in the vicinity of one domain thick, and, while actual measurements have not been obtained due to the thinness of the film, it is estimated that when measured in terms of wave length of light the thickness of the film is in the order of 100 Angstroms. In the species of the novel, permanently magnetizable structure shown in Fig. 5 of the drawings, the first piece of backing material 22 has a single layer film 25 of a magnetizable material thereon which comprises an alloy of platinum and cobalt. This film, like film 23, 24 of the species of invention shown in Fig. 4, has a thickness in the order of one domain, and also has a light-reflecting surface. Subsequent to the formation of the thin films 23, 24 or 25 on their respective backing materials, the resulting structure is brought within juxtaposition to a strong magnetic field, and is thereby permanently magnetized. While each of the embodiments of the magnetizable structures shown in Figs. 4 and 5 of the drawings have been described as having light-reflecting surfaces, it should be understood that this characteristic is not essential for its relatively small mass makes the structure ideal for use as the movable armature of any type of transducer device. However, if the surface of the film covering the magnetizable structure is light-reflective, it is particularly well-suited for use as the movable armature element of a sensitive electrical energy-measuring instrument, and therefore, each of the structures has been described as having this property.

In order to obtain films of magnetizable material having thicknesses of the above-mentioned order, the most suitable method heretofore used is to evaporate the magnetizable material on the backing structure 22. A particular apparatus for providing a film by such a method, is illustrated in Fig. 5 of the drawing. The apparatus includes a bell jar 26 having a covering 27 thereover for maintaining a vacuum within the bell jar, and a table-like pedestal 28 fixed to the inner surface of covering 27 on which the pieces or sheets of insulating material 22 are disposed. Positioned on either side of table-like pedestal 28 are two pairs of relatively rigid, conductive wires 29 and 30, which are supported within bell jar 26 by a pair of stoppers 34 and 35, respectively, through which the conductive wires 29 and 30 pass. The inner ends of each pair of conductive wires 29 and 30 have a filament 32 and 33, respectively, connected thereacross, and the outer ends thereof are coupled to a source of energizing potential through a pair of supply transformers 36 and 37, respectively.

With the above apparatus, if it is desired to produce the magnetizable structure illustrated in Fig. 4 of the drawings each of the filaments 32 and 33 is constructed primarily of a ferrous material, and upon the application of an energizing potential to the primary of the supply transformers 36 and 37, current flows through the filaments 32 and 33 causing a ferrous film to form on the pieces of backing material 22. The ferrous filaments are then replaced with filaments that are constructed primarily of aluminum, and the operation repeated so that a top film of aluminum is formed over the ferrous film to protect the same. Should it be desired to produce the magnetizable structure illustrated in Fig. 5 of the drawings, the filament 33 is constructed of platinum material, and filament 32 constructed of a cobalt material. Because cobalt filament structures are relatively hard to obtain on the market, the filament 32 may be constructed of tungsten and have a bead of cobalt 38 deposited thereon. With the filaments 32 and 33 thus constructed, upon the application of current through the filaments, an alloy of platinum and cobalt is formed on the surface of the pieces of backing material 22, which has the desired property of being permanently magnetizable. While the above-described apparatus has been described as suitable for producing the desired thin magnetizable film on the surface of a backing material, it should be understood that the apparatus disclosed is illustrative of one method only of obtaining the desired thin magnetizable film, and that the invention is not restricted to magnetizable structures having thin films formed in this manner.

Adverting again to Figs. 2 and 3 of the drawings, the permanently magnetizable structure 21 is supported in the open area 16 of electromagnet core structure 14 by a supporting means which, in the particular transducer device disclosed, comprises a torsional supporting spring 41 having the ends thereof secured to the inner surface of the casing enclosing the transducer device in the manner best seen in Fig. 3 of the drawings. While the supporting means for the permanently magnetizable structure 21 is disclosed as a torsional spring 41, it should be understood that the particular use to which the transducer will be put, will generally determined the manner in which the permanently magnetizable structure 21 is supported in the open area of the electromagnet core structure.

The permanently magnetizable structure 21, which in essence comprises a movable armature, is caused to move against the action of torsional supporting spring 41 by a solenoid means comprising a solenoid coil 42 wound around a portion of the core structure 14. Solenoid coil 42 is adapted to have the electric signal to be measured applied thereto, and serves to produce a varying magnetic field which causes the movable armature structure 21 to be mechanically deflected in a manner that can be observed or measured.

In order to facilitate observation of the deflection or movement of movable armature structure 21, the casing 13 of transducer 12 has a window 43, best seen in Fig. 2, built therein, and is enclosed in container 11, as is shown in Fig. 1 of the drawings, along with a light source 44. The light source 44 is positioned in container 11 adjacent a mask 45 having an aperture 46 therein through which a portion of the light rays from source 44 pass. Mask 45 is positioned within container 11 in such a manner that the light rays passing through aperture 46 enter casing 13 of the transducer through window 43, and impinge on the light-reflecting surface of movable armature structure 21. The light rays reflected from movable armature structure 21 are directed against an adjustable mirror 47 mounted on the side of container 11, by means of which they are again reflected to a calibrated scale 48 also mounted on the side of container 11 on the end thereof opposite from adjustable mirror 47.

In operation, the electrical signal to be measured is applied to transducer 12 by means of a pair of terminals 49 on the top thereof, causing a current flow through the solenoid coil 42 of the transducer which produces a varying magnetic force through the electromagnet core structure 14, and across the open area 16. The varying magnetic field across the open area 16 causes a deflection of the movable armature structure 21 which is proportional to the current flow in solenoid coil 42 produced by the electrical signal being measured, and deflection of the movable armature structure 21 in turn causes the ray of light impinging thereon from aperture 46 to be displaced a finite distance along the length of calibrated scale 48. As this distance is a function of the current flowing in coil 42 by reason of the electrical signal to be measured, the value of the current can be obtained by a reading of the calibrated scale 48. By adjusting mirror 47 so that the ray of light directed against the scale 48 is caused to strike the zero or reference position of the scale for zero current flow, the value of the applied current may be obtained by a direct reading of the scale 48.

With reference, now, to Fig. 7 of the drawings, a second species of an electrical measuring instrument which incorporates many of the novel features of this invention, is schematically shown. The electrical measuring instrument illustrated in Fig. 7 constitutes an oscilloscope, and includes a transducer device that comprises an electromagnet core structure 52 having an open area 53 therein, and a solenoid means comprising a coil 54 wound around a portion of the core structure. Disposed in open area 53 is a movable armature structure 55 that is secured to a vertically disposed torsional spring 56 having the ends thereof fixed to a pair of supports 57 that are secured to the outer casing (not shown) in which the transducer device is mounted. The movable armature structure 55 comprises a comparatively light-weight piece of insulating material having a thin film of magnetizable material formed thereon which preferably has a light-reflecting surface, and is substantially identical in construction to the movable armature structure 21 illustrated in either Fig. 4 or Fig. 5 of the drawings. As the construction of the movable armature structure 55 has been sufficiently described with relation to the structures shown in Figs. 4 and 5, a further description thereof is not believed to be necessary.

In operation, the electrical signal to be measured is applied to the coil 54, and produces a varying magnetic field through the electromagnet core structure 52 and across the open area 53 that causes a deflection or mechanical movement of the movable armature structure 55. As the electrical signal applied to coil 54 is generally of an alternating nature, the varying magnetic field across the open area 53 causes an oscillating type of deflection of the movable armature coil 55 which is secured to torsional spring 56, and is free to oscillate at a frequency and amplitude which are related to the frequency and amplitude of the alternating current signal applied to coil 54.

In order to derive a perceptible indication of the amplitude of oscillation of the movable armature structure 55, the transducer device 51 is included in an instrument container (not shown) which also has a source of light 58, an optical system 59, mirror 61 and a screen 62, disposed therein. The optical system 59, mirror 61, light source 58 and transducer 51 are physically disposed relative to one another in a manner such that light rays passing through the optical system 59 impinge upon the light-reflecting surface of movable armature structure 55, and are reflected thereby to the screen 62 located in a position such that light reflected from movable armature structure 55 strikes a spot corresponding to zero amplitude signal, when there is no current flowing in coil 54. Upon the application of an electrical signal to coil 54, the resulting oscillating deflections of movable armature structure 55 causes the light beam deflected therefrom to sweep across the screen 62 in a manner proportional to the signal applied to the coil 54, and an indication of the characteristics of the signal can be thereby obtained. If desired, the mirror 61 may be secured to a rotatable shaft supported by a journaling means 63 which allows the mirror to be rotated about an axis transverse to the axis of rotation of the movable armature structure 55. The shaft to which mirror 61 is secured is operatively connected to a motor means 64 through a rocking arm 65 and cooperating cam drive 66 therefor, for causing the mirror to be oscillated or rocked in synchronism with the oscillating deflections of the movable armature structure 55. The light rays reflected from movable armature structure 55 can thereby be made to trace out a sine wave reproduction of the electrical signal applied to coil 54, and thus a better indication of the nature of the electrical signal is obtained.

Adverting next to Figure 8 of the drawings, still another device is shown which incorporates the novel features of the invention in its design. The device constitutes a fluid flow meter for measuring small gas flow rates that cannot normally be detected by most existing fluid flow meters which have a relatively high friction and which are therefore insensitive to flow rates in the range over which the present device is designed to operate. The meter comprises an outer housing 71 constructed of a non-magnetic material, and shaped in the form of a conduit. Rotatably supported in the conduit formed by housing 71 is a rotary paddle wheel 74 which has a plurality of blade elements 75, 76, 77, and 78, adapted to extend across the fluid path defined by housing 71. The blade elements 75 to 78 are each constructed of a relatively light, non-magnetizable backing material having a thin film of magnetizable material formed thereon with a thickness in the order of one domain. Each of the blade elements is therefore similar in construction to the permanent magnet structures illustrated in Figs. 4 and 5 of the drawings, and constitutes a permanent magnet. Because of their relatively light construction, and due to the fact that each of the blade elements 75 through 78 extends into the flow path formed through conduit 71, paddle wheel 74 is adapted to be acted upon by the fluid flowing through the device in a manner such that it is rotated at a speed which is related to the fluid flow rate.

In order to measure the speed of rotation of the paddle wheel 74, and therefore the fluid flow rate, a pick-up assembly is provided which comprises a coil structure 79 mounted on housing 71, and adapted to be successively acted upon by the respective fields of each of the permanently magnetizable blade elements 75 through 79 as the same are rotated. Hence, as the blade elements rotate due to the action of the flowing fluid, an electric voltage will be generated in the coil structure 79 due to the alternate cutting of the conductors of the coil structure by the lines of flux of each of the permanently magnetized blade elements, as the same come within and pass beyond the location of the coil structures. This electric voltage is related to the speed of rotation of the rotary paddle wheel 74, and therefore to the rate of fluid flow, and by electrically connecting the coil structures 79 to an indicating instrument means 80, which may be a high impedance voltmeter, for producing perceptible indication of the rate of the flow with negligible reaction on the motion of the paddle wheel.

Thus, by reason of the invention, an extremely sensitive fluid flow meter is made available in the art, which meter is inherently capable of deriving an indicator of fluid flow rates that cannot be measured by existing meters.

From the foregoing description, it can be readily appreciated that the invention provides many novel features, included amongst which is an armature structure for use in electrical transducers, which has a relatively small mass, can be permanently magnetized, and, if desired, can be constructed to have a light-reflecting surface so as to be ideally suited for incorporation in transducer devices designed for use in electrical measuring instruments. The invention also makes available improved transducer devices for converting electrical to mechanical energy, and greatly improved, high-sensitivity, fast response electrical measuring instruments by reason of the incorporation thereinto of improved transducer devices having movable armature structure of the above-described type.

It is believed to be obvious that other modifications and variations of the present invention are possible in the light of the above teachings, and it should therefore be understood that changes may be made herein which are within the full intended scope of the invention as defined by the appended claims.

What I claim as new and desire to secure by Letters Patent of the United States is:

1. A combined light reflecting and permanent magnet structure adapted to be deflected by a magnet field comprising a relatively lightweight piece of insulating material having an extremely thin film of magnetizable material covering the surface thereof, said magnetizable material having light reflecting properties and forming a reflecting mirror surface, a source of light adapted to have a portion thereof impinge on said structure whereby said impinging light is deflected proportionally to deflection of said structure by a magnetic field.

2. A unitary permanent magnet and light reflecting structure adapted to be deflected by a magnetic field comprising a lightweight piece of insulating material of microscopic thickness having a comparatively thinner film of magnetizable material thereon, said magnetizable material having light reflecting properties, and forming a mirror surface, said material including a layer of ferrous material, a source of light adapted to have a portion thereof impinge on said structure whereby said impinging light is deflected proportionally to deflection of said structure by a magnetic field.

3. A combined permanent magnet and light reflecting structure adapted to be deflected by a magnetic field comprising a relatively thin flake of mica having a thickness of the order of a fraction of a millimeter, said mica having a first comparatively thin film of ferrous material formed thereon and a second comparatively thin film of aluminum formed on said first film and comprising a light reflective surface whereby light impinging thereon is deflected proportionally to deflection of said structure due to a magnetic field.

4. A unitary permanent magnet and light reflecting structure adapted to be deflected by a magnetic field comprising a lightweight piece of insulating material, and a film of magnetizable material comprising an alloy of cobalt and platinum formed on the surface of said piece of insulating material and comprising a light reflective surface, and a source of light adapted to have a portion thereof impinge on said structure whereby said impinging light is deflected proportionally to deflection of said structure by a magnetic field.

5. A unitary permanent magnet and light reflecting structure adapted to be deflected by a magnetic field comprising a lightweight relatively thin sheet of mica, and a thin film of magnetizable material formed on the surface of said sheet of mica, said magnetizable material comprising an alloy of cobalt and platinum and having a thickness of the order of one domain, said magnetizable material also having the elemental particles thereof permanently aligned to produce a magnetic field and forming a light reflective surface, and a source of light adapted to have a portion thereof impinge on said structure whereby said impinging light is deflected proportionally to deflection of said structure by a magnetic field.

6. A transducer including in combination means for producing a varying magnetic field and a movable armature disposed in said varying magnetic field, means supporting said armature to permit movement thereof in response to said magnetic field, said movable armature comprising a relatively lightweight piece of non-magnetizable material having a thin film of light reflecting magnetizable material formed on the surface thereof.

7. A transducer including in combination an electromagnet core structure having an open area therein, solenoid means surrounding a portion of said core structure for producing a varying magnetic field across said open area, and a movable armature positioned in said open area, means supporting said armature to permit movement thereof in response to said magnetic field, said movable armature comprising a relatively lightweight piece of insulating material, and a thin film of light reflecting magnetizable material having a thickness in the vicinity of one domain formed on the surface of said piece of insulating material.

8. A transducer for use in an electrical measuring instrument including in combination an electromagnet core structure having an open area therein, solenoid means surrounding a portion of said core structure for producing a varying magnetic field across said open area proportional to the electrical energy to be measured and a combination movable armature and mirror positioned in said open area, means supporting said armature to permit movement thereof in response to said magnetic field, said movable armature comprising a relatively lightweight piece of non-magnetizable material having a thin film of light reflecting magnetizable material covering the surface thereof and forming a mirror surface.

9. A transducer for use in electrical measuring instruments including in combination an electromagnetic core structure having an open area therein, solenoid means surrounding a portion of said core structure for producing a varying magnetic field across said open area proportional to the electrical energy to be measured, a torsional support positioned in said open area, and a combination movable armature and mirror secured to said torsional support and disposed in said open area, said movable armature comprising a relatively lightweight piece of non-magnetizable material having a thin film of magnetizable material covering the surface thereof and forming a mirror surface.

10. An electrical measuring instrument including in combination a transducer comprising an electromagnet core structure having an open area therein, solenoid means surrounding a portion of said core structure for producing a varying magnetic field across said open area proportional to the electrical energy to be measured and a combination movable armature and mirror positioned in said open area, said movable armature comprising a relatively lightweight piece of non-magnetizable material having a thin film of magnetizable material covering the surface thereof and forming a mirror surface, a source of light adapted to have a portion of the rays emanating therefrom impinge on said combination movable armature and mirror, and indicator means positioned adjacent said transducer and adapted to have the rays of light reflected from the mirror surface of said combination movable armature and mirror strike thereon whereby an indication of the character of the electrical energy being measured is obtained.

11. An electrical measuring instrument including in combination a transducer comprising an electromagnet core structure having an open area therein, solenoid means surrounding a portion of said core structure for producing a varying magnetic field across said open area proportional to the electrical energy to be measured and a combination movable armature and mirror positioned in said open area, said combination armature and mirror comprising a permanently magnetizable structure having a light reflecting surface, a source of light adapted to have a portion of the rays emanating therefrom impinge on said combination movable armature and mirror, and indicator means positioned adjacent said transducer and adapted to have the rays of light reflected from the light reflecting surface of said combination movable armature and mirror strike thereon whereby an indication of the character of the electrical energy being measured is obtained.

12. A galvanometer including in combination a transducer comprising an electromagnet core structure having an open area therein, solenoid means surrounding a portion of said core structure for producing a varying magnetic field across said open area proportional to the electrical energy to be measured, a torsional support positioned in said open area, and a combination movable armature and mirror secured to said torsional support, and positioned in said open area, said combination armature and mirror comprising a permanently magnetizable structure having a light reflecting surface, a source of light adapted to have a portion of the rays emanating therefrom impinge on said combination movable armature and mirror, and indicator means comprising a calibrated scale positioned adjacent said transducer, and adapted to have the rays of light reflected from the light reflecting surface of said combination movable armature and mirror strike thereon whereby an indication of the character of the electrical energy being measured is obtained.

13. An oscilloscope including in combination a transducer comprising an electromagnet core structure having an open area therein, solenoid means surrounding a portion of said core structure for producing a varying magnetic field across said open area proportional to the electrical energy to be measured, rotatable supporting means positioned in said open area, and a combination movable armature and mirror secured to said rotatable supporting means and positioned in said open area, said combination armature and mirror comprising a permanently magnetizable structure having a light reflecting surface, a source of light adapted to have a portion of the rays emanating therefrom impinge on said combination movable armature and mirror, and indicator means comprising a screen positioned adjacent said transducer and adapted to have the rays of light reflected from the light reflecting surface of said combination movable armature and mirror strike thereon whereby an indication of the character of the electrical energy being measured is obtained.

14. A combined light reflecting and permanent magnet structure adapted to be deflected by a magnetic field comprising a relatively lightweight piece of insulating material, a film of magnetizable material having a thickness of the order of one domain on the surface of said insulating material and forming a light reflecting mirror surface, a source of light adapted to have a portion thereof impinge on said structure whereby said impinging light is deflected proportionally to deflection of said structure by a magnetic field.

References Cited in the file of this patent

UNITED STATES PATENTS

| | | |
|---|---|---|
| 494,964 | Northrup | Apr. 4, 1893 |
| 1,662,564 | Colbert et al. | Mar. 13, 1928 |
| 1,750,275 | Legg | Mar. 11, 1930 |
| 1,777,308 | Holweck | Oct. 7, 1930 |
| 1,797,237 | Kruse | Mar. 24, 1931 |
| 1,906,803 | Mueller | May 2, 1933 |
| 2,131,187 | Liebmann | Sept. 27, 1938 |
| 2,153,363 | Bruche | Apr. 4, 1939 |
| 2,187,541 | Coranson et al. | Jan. 16, 1940 |
| 2,317,199 | Kirschbaum | Apr. 20, 1943 |
| 2,352,976 | Schaefer | July 4, 1944 |
| 2,413,604 | Colbert et al. | Dec. 31, 1946 |
| 2,413,605 | Colbert et al. | Dec. 31, 1946 |
| 2,432,657 | Colbert et al. | Dec. 16, 1947 |
| 2,573,998 | Thompson | Nov. 6, 1951 |
| 2,710,376 | Sias | June 7, 1955 |

FOREIGN PATENTS

| | | |
|---|---|---|
| 511,164 | Great Britain | Oct. 28, 1937 |